United States Patent
Li (10) Patent No.: US 10,586,110 B2
(45) Date of Patent: Mar. 10, 2020

(54) TECHNIQUES FOR IMPROVING THE QUALITY OF SUBJECTIVE DATA

(71) Applicant: NETFLIX, INC., Los Gatos, CA (US)

(72) Inventor: Zhi Li, Mountain View, CA (US)

(73) Assignee: NETFLIX, INC., Los Gatos, CA (US)

(*) Notice: Subject to any disclaimer, the term of this patent is extended or adjusted under 35 U.S.C. 154(b) by 99 days.

(21) Appl. No.: 15/406,617

(22) Filed: Jan. 13, 2017

(65) Prior Publication Data

US 2018/0121730 A1 May 3, 2018

Related U.S. Application Data

(60) Provisional application No. 62/417,230, filed on Nov. 3, 2016.

(51) Int. Cl.

| | |
|---|---|
| *H04N 11/02* | (2006.01) |
| *G06K 9/00* | (2006.01) |
| *H04N 21/466* | (2011.01) |
| *H04N 17/00* | (2006.01) |
| *G06K 9/03* | (2006.01) |
| *G06T 3/40* | (2006.01) |
| *G06T 7/00* | (2017.01) |
| *H04N 21/44* | (2011.01) |
| *H04N 21/475* | (2011.01) |

(52) U.S. Cl.
CPC ...... *G06K 9/00718* (2013.01); *G06K 9/00711* (2013.01); *G06K 9/00765* (2013.01); *G06K 9/036* (2013.01); *G06T 3/4092* (2013.01); *G06T 7/0002* (2013.01); *H04N 17/004* (2013.01); *H04N 21/44008* (2013.01); *H04N 21/4662* (2013.01); *H04N 21/4756* (2013.01); *G06T 2207/30168* (2013.01)

(58) Field of Classification Search
CPC .................................................. G06K 9/00718
USPC .................................................. 375/240.02
See application file for complete search history.

(56) References Cited

U.S. PATENT DOCUMENTS

| | | | |
|---|---|---|---|
| 2002/0090134 A1 | 7/2002 | Van Zon | |
| 2003/0234865 A1* | 12/2003 | Ali | H04N 17/04 348/190 |
| 2006/0152585 A1* | 7/2006 | Bourret | G06T 7/001 348/E17.003 |

(Continued)

OTHER PUBLICATIONS

Wang et al., "Image Quality Assessment: From Error Visibility to Structural Similarity," IEEE Transactions on Image Processing, Apr. 2004, vol. 13, No. 4, pp. 1-14.

(Continued)

*Primary Examiner* — Leron Beck
(74) *Attorney, Agent, or Firm* — Artegis Law Group, LLP (57) ABSTRACT

In various embodiments, a subjective modeling engine mitigates inaccuracies in subjective content assessments. The subjective modeling engine generates a model that includes the subjective content assessments in addition to parameters for subjective scores and subjective factors. The subjective modeling engine initializes the parameters and then performs optimization operations that increase the likelihood that the optimized subjective scores compensate for the optimized subjective factors. Advantageously, because the subjective modeling engine jointly optimizes the subjective scores and the subjective factors, the optimized subjective scores provide unbiased and consistent digital content assessments.

20 Claims, 4 Drawing Sheets

(56) References Cited

U.S. PATENT DOCUMENTS

| | | | |
|---|---|---|---|
| 2012/0030367 A1* | 2/2012 | Lei | H04N 21/2402 |
| | | | 709/231 |
| 2014/0100820 A1* | 4/2014 | Sone | G01N 21/57 |
| | | | 702/189 |
| 2014/0122506 A1 | 5/2014 | Jebara et al. | |
| 2016/0021376 A1 | 1/2016 | Andreopoulos et al. | |

OTHER PUBLICATIONS

Aaron et al., "Per-Title Encode Optimization—Netflix TechBlog—Medium", Available on: http://techblog.netflix.com/2015/12/per-title-encode-opt, Dec. 14, 2015, 15 pages.

Li et al., "Toward A Practical Perceptual Video Quality Metric", Available on: http://techblog.netflix.com/2016/06/toward-practical-perceptual-video.html, Jun. 6, 2016, pp. 1-24.

Lin et al., "A Fusion-based Video Quality Assessment (FVQA) Index", APSIPA Trans. Signal and Information Processing, 2014, Dec. 9-12, 2014, 5 pages.

Wolf et al., "Video Quality Model for Variable Frame Delay (VQM_VFD)", NTIA Technical Memorandum TM-11-482, U.S. Department of Commerce, Sep. 2011, 27 pages.

Cortes et al., "Support-Vector Networks", Machine Learning, vol. 20, No. 3, 1995, pp. 273-297.

Seshadrinathan et al., "Study of Subjective and Objective Quality Assessment of Video", IEEE Transactions on Image Processing, Jun. 2010, vol. 19, No. 6, pp. 1427-1441.

Rec. ITU-R BT.500-11 "Methodology for the Subjective Assessment of the Quality of Television Pictures", Available on: https://www.itu.int/rec/R-REC-BT.500, pp. 1-48.

MacKay, David. J. C., "Information Theory, Inference, and Learning Algorithms", Cambridge University Press 2003, Version 7.2, Mar. 28, 2005, 640 pages.

Cover et al., "Elements of Information Theory, Second Edition", Wiley-Interscience publication, 2006, 774 pages.

"VMAF—Video Multi-Method Assessment Fusion", Available on: https://github.com/Netflix/vmaf, retrieved on Apr. 5, 2018, 13 pages.

ITU-T P.910: "Subjective Video Quality Assessment Methods for Multimedia Applications", Series P: Telephone Transmission Quality, Telephone Installations, Local Line Networks, Apr. 2008, 42 pages.

Janowski et al., "The Accuracy of Subjects in a Quality Experiment: A Theoretical Subject Model," IEEE Transactions on Multimedia, vol. 17, No. 12, Dec. 2015, pp. 2210-2224.

Whitehill et al., "Whose Vote Should Count More: Optimal Integration of Labels from Labelers of Unknown Expertise", Advances in Neural Information Processing Systems, 2009, pp. 1-9.

Wang et al., "Image Quality Evaluation using Image Quality Ruler and Graphical Model," in IEEE International Conference on Image Processing (ICIP), 2015, 5 pages.

"Netflix Public Dataset", Available on: https://github.com/Netflix/vmaf#netflix-public-dataset, 12 pages.

"Report on the Validation of Video Quality Models for High Definition Video Content," Video Quality Experts Group (VQEG), Tech. Rep., Version 2.0, Jun. 30, 2010, pp. 1-93.

Kuhlisch Wiltrud et al., "A statistical approach to calibrating the scores of biased reviewers of scientific papers", Metrika, Springer Berlin Heidelberg, Berlin/Heidelberg, vol. 29, No. 1, Apr. 24, 2015, pp. 27-57, XP035865715.

International Search Report and Written Opinion for International Application No. PCT/US2017/060045, dated Dec. 15, 2017, 15 pages.

* cited by examiner

Belief Propagation (BP) Pseudo-Code
375

- Input:
  - $x_{e,s}$ for $s = 1, \ldots, S$ and $e = 1, \ldots, E$.
  - Refresh rate $\alpha$.
  - Stop threshold $\Delta x^{thr}$.

- Initialize $\{x_e\} \leftarrow \{\mu_e\}$, $\{b_s\} \leftarrow \{0\}$, $\{v_s\} \leftarrow \{\sigma_s\}$, $\{a_c\} \leftarrow \{\sigma_c\}$.

- Loop:
  - $\{x_e^{prev}\} \leftarrow \{x_e\}$.
  - $b_s \leftarrow (1-\alpha) \cdot b_s + \alpha \cdot b_s^{new}$ where $b_s^{new} = b_s - \frac{\partial L(\theta)/\partial b_s}{\partial^2 L(\theta)/\partial b_s^2}$, for $s = 1, \ldots, S$.
  - $v_s \leftarrow (1-\alpha) \cdot v_s + \alpha \cdot v_s^{new}$ where $v_s^{new} = v_s - \frac{\partial L(\theta)/\partial v_s}{\partial^2 L(\theta)/\partial v_s^2}$, for $s = 1, \ldots, S$.
  - $a_c \leftarrow (1-\alpha) \cdot a_c + \alpha \cdot a_c^{new}$ where $a_c^{new} = a_c - \frac{\partial L(\theta)/\partial a_c}{\partial^2 L(\theta)/\partial a_c^2}$, for $c = 1, \ldots, C$.
  - $x_e \leftarrow (1-\alpha) \cdot x_e + \alpha \cdot x_e^{new}$ where $x_e^{new} = x_e - \frac{\partial L(\theta)/\partial x_e}{\partial^2 L(\theta)/\partial x_e^2}$, for $e = 1, \ldots, E$.
  - If $\left(\sum_{e=1}^{E}(x_e - x_e^{prev})^2\right)^{\frac{1}{2}} < \Delta x^{thr}$, break.

- Output: $\{x_e\}$, $\{b_s\}$, $\{v_s\}$, $\{a_c\}$.

TECHNIQUES FOR IMPROVING THE QUALITY OF SUBJECTIVE DATA

CROSS-REFERENCE TO RELATED APPLICATIONS

This application claims the priority benefit of the U.S. Provisional Patent Application having Ser. No. 62/417,230 and filed on Nov. 3, 2016. The subject matter of this related application is hereby incorporated herein by reference.

BACKGROUND OF THE INVENTION

Field of the Invention

Embodiments of the present invention relate generally to computer science and, more specifically, to techniques for improving the quality of subjective data.

Description of the Related Art

Efficiently and accurately encoding source video content is an important aspect of real-time delivery of high-quality video content. Among other things, the memory required to store and the streaming bandwidth required to transmit encoded video content are less than the memory required to store and the streaming bandwidth required to transmit corresponding source video content. Because of variations in the quality of encoded video content, quality controls are usually implemented to ensure that the visual quality of reconstructed video content derived from the encoded video content, as perceived by the end-user, is acceptable. Because manually verifying the perceived visual quality of reconstructed video content is prohibitively time consuming, various automated techniques for assessing reconstructed video content quality are typically integrated into the encoding and streaming infrastructure.

In one approach to automatically assessing the quality of reconstructed video content, one or more full-reference quality metrics, such as peak signal-to-noise ratio (PSNR), are used to compare the source video content to the encoded video content. However, while such metrics accurately reflect signal fidelity (i.e., the faithfulness of the encoded video content to the source video content), these metrics typically do not reliably predict human perception of the quality of the reconstructed video content derived from the encoded video content. For example, metrics that reflect signal fidelity typically do not indicate that visual artifacts present in still scenes are more likely to be noticed by viewers than visual artifacts present in fast-motion scenes and are therefore more likely to degrade the overall viewing experience.

Other approaches to assessing the quality of reconstructed video content involve generating perceptive quality metrics based on raw opinion scores from end-users of the visual quality of the reconstructed video content. However, raw opinion scores typically include inaccuracies that degrade the accuracy of the perceptive quality metrics generated from the raw opinion scores. For example, raw opinion scores oftentimes include inaccuracies attributable to subject bias, subject inconsistency, and content ambiguity, to name a few. In an example of subject bias, human subjects that are relatively picky viewers tend to assign lower raw opinion scores than human subjects that are relatively undemanding viewers. In an example of subject inconsistency, many human subjects are unable to maintain a consistent level of attentiveness while viewing different portions of reconstructed video content and, consequently, assign raw opinion scores in an inconsistent manner. In an example of content ambiguity, a portion of reconstructed video content that portrays a water surface that is rippling at nighttime is more difficult to evaluate than a portion of reconstructed video content that portrays a bright blue sky.

To mitigate inaccuracies in the raw opinion scores, some approaches to generating perceptive quality metrics pre-process the raw opinion scores. For example, some approaches compute a mean opinion score (MOS) for each portion of reconstructed video content based on the raw opinion scores, where the MOS is the average of the raw opinion scores of the portion of reconstructed video content. However, while mean opinion scores may compensate for subject bias and subject inconsistency, mean opinion scores do not compensate for content ambiguity. In another example, some approaches apply "z-scoring" to normalize the raw opinion scores on a per-subject basis. However, applying z-scoring only partially compensates for subject bias and subject inconsistency.

In general, other existing approaches to mitigating inaccuracies in the raw opinion scores analyze only a portion of the raw opinion scores or partition the raw opinion scores based on subject or portion of reconstructed video content and then analyze each partition independently. Thus, while a given existing approach may mitigate some inaccuracies, the existing approach does not necessarily mitigate other inaccuracies. In addition, existing techniques for improving the quality of subjective data for different applications across a wide variety of fields (e.g., quality assessment of images, audio, computer graphics, etc.) suffer limitations similar to those discussed above.

As the foregoing illustrates, what is needed in the art are more effective techniques for mitigating inaccuracies in subjective digital content assessments, such as raw opinion scores that reflect the perceived quality of reconstructed video content.

SUMMARY OF THE INVENTION

One embodiment of the present invention sets forth a computer-implemented method for mitigating inaccuracies in subjective content assessments. The method includes generating a model that includes subjective content assessments and parameters that includes subjective scores and subjective factors; initializing the parameters; performing one or more optimization operations on the parameters to generate optimized subjective scores and optimized subjective factors, where the optimized subjective scores are configured to compensate for the optimized subjective factors; and storing or transmitting the optimized subjective scores to use as unbiased and consistent digital content assessments.

One advantage of the disclosed techniques for mitigating inaccuracies in subjective content assessments is that the optimized subjective scores comprehensively compensate for a variety of subjective factors. In particular, the optimized subjective scores may compensate for subject bias, subject inconsistency, and content ambiguity. Further, the optimized subjective factors provide additional information regarding the reliability of the subjective content assessments.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skilled in the art that the present invention may be practiced without one or more of these specific details.

Perceptual Quality Modeling System Overview

Figure 1:
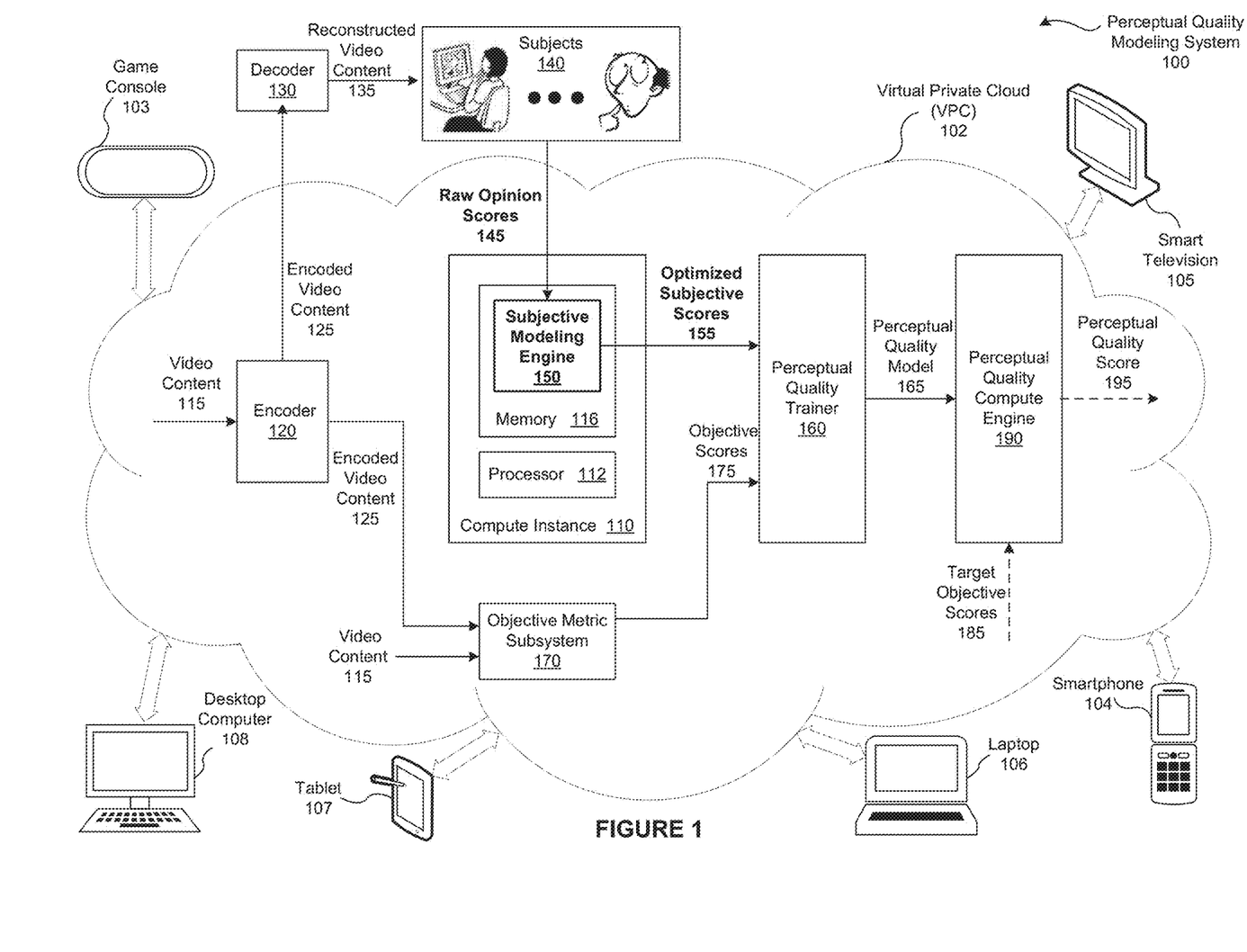
FIG. 1 is a conceptual illustration of a perceptual quality modeling system configured to implement one or more aspects of the present invention.

FIG. 1 is a conceptual illustration of a perceptual quality modeling system 100 configured to implement one or more aspects of the present invention. As shown, the perceptual quality modeling system 100 includes a virtual private cloud (i.e., encapsulated shared resources, software, data, etc.) 102 connected to a variety of devices capable of transmitting input data and/or displaying video content. Such devices include, without limitation, a game console 103, a smartphone 104, a smart television 105, a laptop 106, a tablet 107, and a desktop computer 108. In alternate embodiments, the perceptual quality modeling system 100 may include any number and/or type of input, output, and/or input/output devices in any combination. For explanatory purposes, multiple instances of like objects are denoted with reference numbers identifying the object and parenthetical numbers identifying the instance where needed.

The virtual private cloud (VPC) 102 includes, without limitation, any number and type of compute instances 110. The VPC 102 receives input user information from an input device (e.g., the laptop 106), one or more computer instances 110 operate on the user information, and the VPC 102 transmits processed information to the user. The VPC 102 conveys output information to the user via display capabilities of any number of devices, such as a conventional cathode ray tube, liquid crystal display, light-emitting diode, or the like.

In alternate embodiments, the VPC 102 may be replaced with any type of cloud computing environment, such as a public or a hybrid cloud. In other embodiments, the perceptual quality modeling system 102 may include any distributed computer system instead of the VPC 102. In yet other embodiments, the perceptual quality modeling system 100 does not include the VPC 102 and, instead, the perceptual quality modeling system 100 includes a single computing unit that implements multiple processing units (e.g., central processing units and/or graphical processing units in any combination).

As shown, each compute instance 110 includes, without limitation, a processor 112 and a memory 116. The processor 112 may be any instruction execution system, apparatus, or device capable of executing instructions. For example, the processor 112 could comprise a central processing unit (CPU), a graphics processing unit (GPU), a controller, a microcontroller, a state machine, or any combination thereof. The memory 116 stores content, such as software applications and data, for use by the processor 112 of the compute instance 110.

The memory 116 may be one or more of a readily available memory, such as random access memory (RAM), read only memory (ROM), floppy disk, hard disk, or any other form of digital storage, local or remote. In some embodiments, a storage (not shown) may supplement or replace the memory 116. The storage may include any number and type of external memories that are accessible to the processor 112. For example, and without limitation, the storage may include a Secure Digital Card, an external Flash memory, a portable compact disc read-only memory (CD-ROM), an optical storage device, a magnetic storage device, or any suitable combination of the foregoing.

In general, the compute instances 110 included in the VPC 102 are configured to implement one or more applications. For example, any number of the compute instances 110 are configured as an encoder 120. The encoder 120 implements any type of data compression techniques as known in the art and in any technically feasible fashion. In some embodiments, the encoder 140 is a parallel chunk encoder that partitions the source data into multiple chunks and then performs data compression techniques concurrently on the chunks.

To comply with resource constraints, such as encoded data size limitations and available streaming bandwidth, the encoder 120 implements lossy data compression techniques that eliminate selected information. By eliminating information, the encoder 120 creates "compression" artifacts that introduce distortions when the source data is reconstructed. The visual quality of the reconstructed source data is often further compromised by other elements included in the transcoding pipeline (i.e., the applications that translate the source data in one format to the reconstructed data in another format). For example, "scaling" artifacts may be introduced during the process of down-scaling and encoding the source data and then up-scaling the decoded data to the source resolution at the display device.

To ensure an acceptable viewing experience, the quality of the reconstructed data and, indirectly, the caliber of the elements included in the transcoding pipeline are typically evaluated at various points in the design and delivery process using quality metrics. The values for the quality metrics are then used to guide the development of applications (e.g., encoders) and the real-time optimization of content delivery, such as stream-switching algorithms that are quality-aware.

Many widely applied quality metrics (e.g., mean-squared-error (MSE) and peak signal-to-noise ratio (PSNR)) measure fidelity—the faithfulness of the reconstructed data to the source data. However, fidelity measurements do not reflect psycho-visual phenomena affecting the human visual system (HVS) such as masking, contrast sensitivity, or the highly structured content in natural images. Further, due to such imperfectly reflected perceptual effects, such fidelity metrics are content-dependent—the values are not comparable across different types of video content. For instance, a portion of reconstructed video content with grain noise is relatively heavily penalized in PSNR although the visual impact detectable by human viewers is relatively low. In general, conventional quality metrics are not a reliable indication of the visual quality as perceived by humans and, therefore, the acceptability of the viewing experience.

For this reason, one or more of the compute instances 110 in the VPC 102 implement machine learning techniques to institute a consistent perceptual quality metric that correlates in a universal manner to subjective human visual experience. During a training phase, depicted in FIG. 1 with solid lines, a perceptual quality trainer 160 executes a machine learning algorithm that trains a supervised learning model to combine objective scores 175 to optimally track subjective scores assigned during viewings of training data.

The training data may include any number of portions of video content 115, and each of the portions of the video content 115 may be of any length. As used herein, each of the portions of the video content 115 refers to any item that includes any amount and type of video content and may also include additional content, such as audio content. For instance, in various embodiments each of the portions of the video content 115 comprises a separate video clip.

In some embodiments the training data includes the MCL-V video database of video clips that is available publically from the University of Southern California. In other embodiments, the ML-V video database of video clips is supplemented with selected high film grain clips and animation titles to increase the diversity and the robustness of the training data. In general, for each portion of the video content 115, the encoder 120 is configured to encode the portion of the video content 115 repeatedly, at a variety of different resolutions and/or quality levels (i.e., bitrates). In this fashion, a predetermined number of portions of the encoded video content 125 are generated from each of the portions of the video content 115 included in the training data.

As shown, for each of the portions of the encoded video content 125, a decoder 130 decodes the portion of the encoded video content 125 to generate a portion of the reconstructed video content 135. Subjects 140 watch the portions of the reconstructed video content 135 on display devices, such as the screen of the laptop 106, and personally rate the visual quality—assigning raw opinion scores 145 to the portions of reconstructed video content 135. The subjects 140 may assess the visual quality of the portions of the reconstructed video content 135 and assign the raw opinion scores 145 in any technically feasible fashion and based on any type of rating system.

For instance, some embodiments may implement absolute category rating (ACR) techniques in which each of the subjects 140 watches each of the portions of the reconstructed video content 135 and assigns a rating of the visual quality. The subjects 140 may assign the quality rating based on any type of consistent scale. For example, the quality ratings could vary on a scale from 1 (visual quality is bad) to 5 (visual quality is excellent). Other embodiments may implement degradation category rating (DCR) techniques. In DCR techniques, for each portion of the reconstructed video content 135, each of the subjects 140 watches both the corresponding portion of the video content 115 as well as the portion of the reconstructed video content 135 and then assigns a rating of the impairments perceived in the portion of the reconstructed video content 135. The subjects 140 may assign the impairment rating based on any type of consistent scale. For example, the impairment ratings could vary on a scale from 1 (impairments are very annoying) to 5 (impairments are imperceptible).

In some embodiments, to increase a likelihood that the raw opinion scores 145 reflect a typical viewing experience, the subjects 140 include a variety of "typical" people without any particular expertise in video content processing. Further, in some embodiments, to increase a likelihood that the raw opinion scores 145 reflect a wide range of viewing conditions, the display devices on which the subjects 140 watch the portions of the reconstructed video content 135 and, optionally, the portions of the video content 115 may be varied. For example, the display devices may include, without limitation, the game console 103, the smartphone 104, the smart television 105, the laptop 106, the tablet 107, and the desktop computer 108.

As shown, for each of the portions of the reconstructed video content 135, an objective metric subsystem 140 generates the objective score 175 based on comparison operations between the corresponding portion of the encoded video content 125 and the corresponding portion of the video content 115. The objective scores 175 are values for objective metrics commonly referred to as a full-reference quality indices, and the objective scores 175 may be generated in any technically feasible fashion. In general, each of the objective metrics exhibits both strengths and weaknesses. For example, a visual information fidelity (VIF) is relatively good at detecting slight blurring artifacts, but is relatively poor at detecting blocking artifacts.

To leverage the strengths and mitigate the weaknesses, the objective metric generation subsystem 170 is configured to calculate the objective scores 175 for a set of objective metrics that, together, provide valuable insight into the visual quality across the range of the reconstructed video content 135. For explanatory purposes, the objective scores 175 for a portion of the reconstructed video content 135 are also referred to as the objective scores 175 for the corresponding portion of the encoded video content 125. The selection of the objective metrics may be made in any technically feasible fashion to address any number of anticipated artifacts. For instance, in some embodiments, the objective metrics are empirically selected to assess degradation caused by compression (i.e., blockiness) and scaling (i.e., blurriness). Each of the objective metrics may be associated with any number of values, also known as "features." As part of generating the objective scores 175, the objective metric generation subsystem 170 may include any number of features for each metric in the objective metrics and discard the remainder.

The perceptual quality trainer 150 implements learning algorithms that recognize patterns between the objective scores 175 and subjective scores derived from the raw opinion scores 145. More precisely, the perceptual quality trainer 150 fuses value for the objective scores 175 into perceptual quality scores 195 that reflects experience of the subjects 140. After the perceptual quality trainer 160 finishes executing the learning algorithms, the perceptual quality trainer 150 generates the perceptual quality model 165. The perceptual quality model 165 is a trained supervised learning model that implements the consistent perceptual quality metric.

Subsequently, in a scoring stage, depicted in FIG. 1 with dotted lines, a perceptual quality compute engine 190 receives the perceptual quality model 165 and target objective scores 185 associated with a target portion of reconstructed video content. The perceptual quality compute engine 190 applies the perceptual quality model 165 to the target objective scores 185 and generates the perceptual quality score 195 for the target portion of reconstructed video content. For explanatory purposes, the perceptual quality score 195 for a portion of the reconstructed video content 135 is also referred to as the perceptual quality score 195 for the corresponding portion of the encoded video content 125. The target objective scores 185 may be generated in any technically feasible fashion. For example, the objective metric subsystem 170 may compare any reference data (e.g., target portion of video content) to any derived target data (e.g., target portion of encoded video content) to calculate the target objective scores 185.

One limitation of conventional perceptual quality modeling systems is that the subjective scores upon which the perceptual quality model 165 are trained are not necessarily reliable. Consequently, the perceptual quality scores 195 that the perceptual quality compute engine 190 generates based on the perceptual quality model 165 may not be accurate. More specifically, the subjective scores for the reconstructed video content 135 are typically derived from raw opinion scores 145 that are assigned by human subjects during viewings of the reconstructed video content 135. However, the raw opinion scores 145 oftentimes include inaccuracies attributable to subjective factors that include subject bias, subject inconsistency, and content ambiguity, to name a few.

In an example of subject bias, human subjects 140 that are relatively picky viewers tend to assign lower raw opinion scores 145 than human subjects 140 that are relatively undemanding viewers. In an example of subject inconsistency, many human subjects 140 are unable to maintain a consistent level of attentiveness while viewing different portions of the reconstructed video content 135 and, consequently, assign raw opinion scores 145 in an inconsistent manner. In an example of content ambiguity, a portion of the reconstructed video content 135 that portrays a water surface that is rippling at nighttime is more difficult to evaluate than a portion of the reconstructed video content 135 that portrays a bright blue sky.

As part of deriving the subjective scores, some conventional perceptual quality modeling systems attempt to mitigate inaccuracies in the raw opinion scores 145. For example, some conventional perceptual quality modeling systems compute a mean opinion score (MOS) for each portion of the reconstructed video content 135 based on the raw opinion scores 145, where the MOS is the average of the raw opinion scores 145 of the portion of the reconstructed video content 135. However, while mean opinion scores may compensate for subject bias and subject inconsistency, mean opinion scores do not compensate for content ambiguity. In another example, some approaches apply "z-scoring" to normalize the raw opinion scores 145 on a per-subject basis. However, applying z-scoring only partially compensates for subject bias and subject inconsistency.

In general, other existing approaches to mitigating inaccuracies in the raw opinion scores 145 analyze only a portion of the raw opinion scores 145, or partition the raw opinion scores 145 based on subject or portion of the reconstructed video content 135 and then analyze each partition independently. Thus, while a given existing approach may mitigate some inaccuracies, the existing approach does not necessarily mitigate other inaccuracies. In addition, existing techniques for improving the quality of subjective data for different applications across a wide variety of fields (e.g., quality assessment of images, audio, computer graphics, etc.) suffer limitations similar to those discussed above.

Optimizing Subjective Scores

To increase the accuracy of the target objective scores 185 that the perceptual quality compute engine 190 computes, the perceptual quality trainer 160 is configured to generate the perceptual quality model 160 based on optimized subjective scores 155. As shown, a subjective modeling engine 150 generates the optimized subjective scores 155 based on the raw opinion scores 145. The subjective modeling engine 150 is included in the memory 116 and executes on the processor 112. In operation, the subjective modeling engine 150 jointly estimates the "true" subjective quality of the portions of the reconstructed video content 135, the biases and consistencies of the subjects 140, and the ambiguity of the portions of the video content 115 based on all the data included in the raw opinion scores 145.

As referred to herein, the "true" subjective quality of a portion of the reconstructed video content 135 is equal to a raw opinion score that would be assigned to the portion of the reconstructed video content 135 by a hypothetical consistent and unbiased subject. For explanatory purposes, the raw opinion scores 145 for a portion of the reconstructed video content 135 are also referred to as the raw opinion scores 145 for the corresponding portion of the encoded video content 125. Because the subjective modeling engine 150 analyzes the raw opinion scores 145 in a comprehensive fashion, the subjective modeling engine 150 mitigates inaccuracy in the raw opinion scores 145 more effectively than conventional approaches to optimizing subjective scores.

Note that the techniques described herein are illustrative rather than restrictive, and may be altered without departing from the broader spirit and scope of the invention. In particular, the subjective modeling engine 150, the objective metric subsystem 170, the perceptual quality trainer 160, and the perceptual quality compute engine 190 may be implemented in any number of software applications in any combination. Further, in various embodiments, any number of the techniques disclosed herein may be implemented while other techniques may be omitted in any technically feasible fashion.

Many modifications and variations on the functionality provided by the subjective modeling engine 150, the objective metric subsystem 170, the perceptual quality trainer 160, and the perceptual quality compute engine 190 will be apparent to those of ordinary skill in the art without departing from the scope and spirit of the described embodiments. Alternate embodiments include any subjective modeling application that improves the accuracy of any type of subjective data include any type of subjective digital content assessments in any field based on jointly estimating "true" subjective scores and any number of subjective factors.

Figure 2:
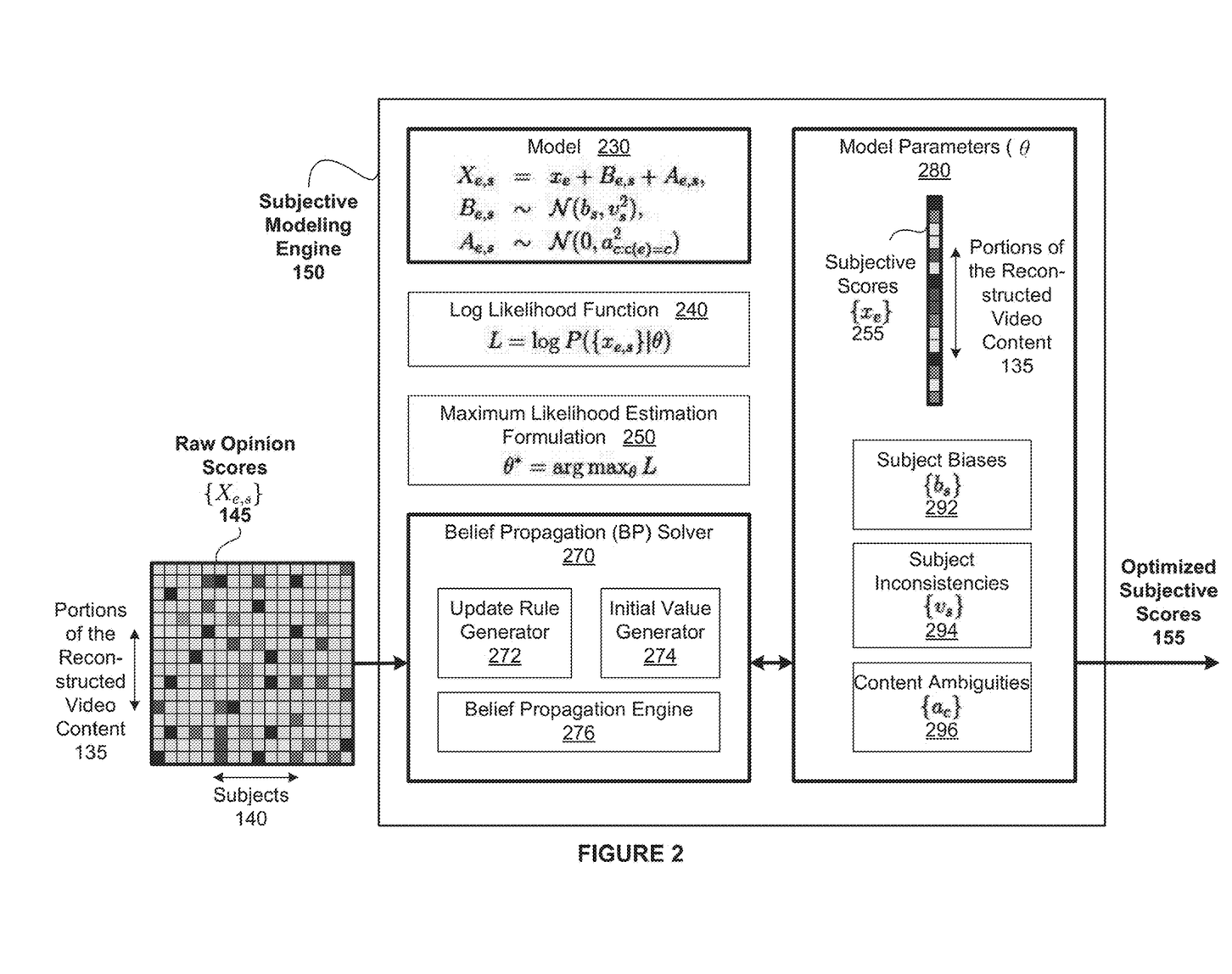
FIG. 2 is a more detailed block diagram of the subjective modeling engine of FIG. 1, according various embodiments of the present invention.

FIG. 2 is a more detailed block diagram of the subjective modeling engine 150 of FIG. 1, according various embodiments of the present invention. As shown, the subjective modeling engine 150 includes, without limitation, a model 230, a likelihood function 240, a maximum likelihood estimation formulation 250, a belief propagation (BP) solver 270, and model parameters 280.

For explanatory purposes only, in the context of the perceptual quality modeling system 100, the subscript s denotes the subject 140, the subscript e denotes a portion of the reconstructed video content 135, and the subscript c denotes a portion of the video content 115 from which a portion of the reconstructed video content 135 is derived. The subscripts ranges from 1 to S, where S is the total number of the subjects 140. The subscript e ranges from 1 to E, where E is the total number of portions of the reconstructed video content 135. The subscript c ranges from 1 to C, where C is the total number of portions of the video content 115.

The inputs to the subjective modeling engine 150 are the raw opinion scores 145. The raw opinion scores 145 are also denoted herein as $\{X_{e,s}\}$. For explanatory purposes only, the raw opinion scores 145 are depicted as a two dimensional matrix where each column is associated with a different subject 140, and each row is associated with a different portion of the reconstructed video content 135. Each item in the matrix visually corresponds to a different raw opinion score 145 and is depicted as a shade of gray, where a darker shade indicates a lower visual quality score and a lighter shade indicates a higher visual quality score. In alternate embodiments, the raw opinion scores 145 may represent any number of subjects 140 and any number of portions of the reconstructed video content 135.

Upon receiving the raw opinion scores 145, the subjective modeling engine 150 generates the model 230 for the raw opinion scores 145. The model 230 includes the model parameters (θ) 290. As shown, the model parameters 290 include, without limitation, subjective scores ($\{x_e\}$) 255, subject biases ($\{b_s\}$) 292, subject inconsistencies ($\{v_s\}$) 294, and content ambiguities ($\{a_c\}$) 296. Together, the subject biases 292, the subject inconsistencies 294, and the content ambiguities 296 are also referred to herein as the "subjective factors."

For each portion of the reconstructed video content 135, the corresponding subjective score 255 estimates the true subjective quality of the portion of the reconstructed video content 135. For each of the subjects 140, the corresponding subject bias 292 estimates the bias of the subject 140, and the corresponding subject inconsistency 294 estimates the inconsistency of the subject 140. In a complementary fashion, for each portion of the video content 115, the content ambiguity 296 estimates the ambiguity of the portion of the video content 115.

In operation, the subjective modeling engine 150 generates the model 230 as follows:

$$X_{e,s} = x_e + B_{e,s} + A_{e,s},$$

$$B_{e,s} \sim \mathcal{N}(b_s, v_s^2),$$

$$A_{e,s} \sim \mathcal{N}(0, a_{c:c(e)=c}^2) \tag{1}$$

In equation (1), $B_{e,s}$ are independent and identically distributed (i.i.d) Gaussian variables that represents the subjective factors 290 that are attributable to the subjects 140. By contrast, $A_{e,s}$ are i.i.d Gaussian variables that represent the subjective factors 290 that are attributable to the portion of the video content 115 from which the portion of the reconstructed video content 135 are derived. For each of the subjects 140, the subject bias 292 comprises the mean of $B_{e,s}$ and the square of the subject inconsistency 294 comprises the variance $B_{e,s}$. For each portion of the video content 115, the square of the content ambiguity 296 comprises the variance of $A_{e,s}$.

After generating the model 230, the subjective modeling engine 150 solves for the unknowns in equation (1)—the model parameters 290, $\theta = (\{x_e\}, \{b_s\}, \{v_s\}, \{a_c\})$. In general, the subjective modeling engine 150 derives a solution for the model 230 that optimizes the likelihood that the subjective scores $\{x_e\}$ 255 compensate for the subject biases 292, the subject inconsistencies 294, and the content ambiguities 294. More precisely, the belief propagation (BP) solver 270 derives a solution for the maximum likelihood estimation (MLE) formulation 250 of the model 230 as:

$$\theta^* \arg\max_\theta L \tag{2}$$

Where L denotes the log likelihood function 240:

$$L = \log P(\{x_{e,s}\} | \theta) \tag{3}$$

As shown, the BP solver 270 includes, without limitation, an update rule generator 272, an initial value generator 274, and a BP engine 276 that implements a BP algorithm. As per equation (1), $X_{e,s}$ is a sum of independent Gaussian variables and a constant, as follows:

$$X_{e,s} \sim \mathcal{N}(x_e + b_s, v_s^2 + a_{c(e)}^2) \tag{4}$$

Accordingly, the update rule generator 272 expresses the log likelihood function 240 based on an independence assumption of the raw opinion scores 145 as:

$$L(\theta) = \log P(\{x_{e,s}\}|\theta) \tag{5}$$

$$= \log P(\{x_{e,s}\}|\{x_e\}, \{b_s\}, \{v_s\}, \{a_c\})$$

$$= \log \prod_{e,s} P(x_{e,s}|x_e, b_s, v_s, a_{c(e)})$$

The update rule generator 272 then applies a Gaussian formula with omission of the constant terms, as follows:

$$L(\theta) = \sum_{e,s} \log P(x_{e,s}|x_e, b_s, v_s, a_{c(e)}) \tag{6}$$

$$\equiv \sum_{e,s} -\frac{1}{2}\log(v_s^2 + a_{c(e)}^2) - \frac{1}{2} \cdot \frac{(x_{e,s} - x_e - b_s)^2}{v_s^2 + a_{c(e)}^2}$$

Subsequently, the update rule generator 272 derives the first-order derivatives for the log likelihood function L(θ) 240 with respect to the subjective scores $\{x_e\}$) 255, the subject biases ($\{b_s\}$) 292, the subject inconsistencies ($\{v_s\}$) 294, and the content ambiguities ($\{a_c\}$) 296 as:

$$\frac{\partial L(\theta)}{\partial x_e} = \sum_s \frac{x_{e,s} - x_e - b_s}{v_s^2 + a_{c(e)}^2} \tag{7}$$

$$\frac{\partial L(\theta)}{\partial b_s} = \sum_e \frac{x_{e,s} - x_e - b_s}{v_s^2 + a_{c(e)}^2}$$

$$\frac{\partial L(\theta)}{\partial v_s} = \sum_e -\frac{v_s}{v_s^2 + a_{c(e)}^2} + \frac{v_s(x_{e,s} - x_e - b_s)^2}{(v_s^2 + a_{c(e)}^2)^2}$$

$$\frac{\partial L(\theta)}{\partial a_c} = \sum_{s,e:c(e)=c} -\frac{a_{c(e)}}{v_s^2 + a_{c(e)}^2} + \frac{a_{c(e)}(x_{e,s} - x_e - b_s)^{2|}}{(v_s^2 + a_{c(e)}^2)^2}$$

The update rule generator 272 then derives the second-order derivatives for the log likelihood function L(θ) 240 with respect to the subjective scores $\{x_e\}$) 255, the subject biases ($\{b_s\}$) 292, the subject inconsistencies ($\{v_s\}$) 294, and the content ambiguities ($\{a_c\}$) 296 as:

$$\frac{\partial^2 L(\theta)}{\partial x_e^2} = \sum_s -\frac{1}{v_s^2 + a_{c(e)}^2} \tag{8}$$

$$\frac{\partial^2 L(\theta)}{\partial b_s^2} = \sum_e -\frac{1}{v_s^2 + a_{c(e)}^2}$$

-continued $$\frac{\partial^2 L(\theta)}{\partial v_s^2} = \sum_e -\frac{a_{c(e)}^2 - v_s^2}{(v_s^2 + a_{c(e)}^2)^2} + \frac{(x_{e,s} - x_e - b_s)^2(a_{c(e)}^4 - 2a_{c(e)}^2 v_s^2 - 3v_s^4)}{(v_s^2 + a_{c(e)}^2)^4}$$

$$\frac{\partial^2 L(\theta)}{\partial a_c^2} = \sum_{s,e:c(e)=c} -\frac{v_s^2 - a_{c(e)}^2}{(v_s^2 + a_{c(e)}^2)^2} + \frac{(x_{e,s} - x_e - b_s)^2(v_s^4 - 2v_s^2 a_{c(e)}^2 - 3a_{c(e)}^4)}{(v_s^2 + a_{c(e)}^2)^4}$$

The update rule generator 272 defines:

$$w_{e,s} = \frac{1}{v_s^2 + a_{c(e)}^2} \quad (9)$$

Finally, the update rule generator 272 applies equations (7), (8), and (9) to the Newton-Raphson update rule:

$$v \leftarrow v - \frac{\partial L/\partial v}{\partial^2 L/\partial v^2} \quad (10)$$

to yield the following update rules for the model parameters 280:

$$x_e^{new} = \frac{\sum_s w_{e,s}(x_{e,s} - b_s)}{\sum_s w_{e,s}} \quad (11)$$

$$b_s^{new} = \frac{\sum_e w_{e,s}(x_{e,s} - x_e)}{\sum_e w_{e,s}}$$

$$v_s^{new} = v_s - \frac{\sum_e w_{e,s} v_s - w_{e,s}^2 v_s (x_{e,s} - x_e - b_s)^2}{\sum_e w_{e,s}^2 (a_{c(e)}^2 - v_s^2) - w_{e,s}^4 (x_{e,s} - x_e - b_s)^2 \left(\begin{array}{c} a_{c(e)}^4 - \\ 2a_{c(e)}^2 v_s^2 - 3v_s^4 \end{array}\right)}$$

$$a_c^{new} = a_c - \frac{\sum_{s,e:c(e)=c} w_{e,s} a_{c(e)} - w_{e,s}^2 a_{c(e)}(x_{e,s} - x_e - b_s)^2}{\sum_{s,e:c(e)=c} w_{e,s}^2 (v_s^2 - a_{c(e)}^2) - w_{e,s}^4 \left(\begin{array}{c} x_{e,s} - \\ x_e - b_s \end{array}\right)^2 \left(\begin{array}{c} v_s^4 - \\ 2v_s^2 a_{c(e)}^2 - 3a_{c(e)}^4 \end{array}\right)}$$

The initial value generator 274 included in the belief propagation solver 270 computes initial values for the model parameters 290. For each portion of the reconstructed video content 135, the initial value generator 274 sets an initial value for the corresponding subjective score 255 equal to the mean opinion score (MOS). For each portion of the reconstructed video content 135, the initial value generator 274 computes the MOS as the average of the raw opinion scores 145 of the portion of the reconstructed video content 135. In addition, for each of the subject biases 292, the initial value generator 270 sets a corresponding initial value equal to zero. The initial value generator 270 sets initial values for the subject inconsistencies 294 to the standard deviation values $\{\sigma_s\}$, where $$\sigma_s = \sqrt{m_{2,s}} \quad (12)$$

and $m_{2,s}$ denotes the 2nd order central moment over the raw opinion scores 145 for the subjects 140. Similarly, the initial value generator 270 sets initial values for the content ambiguities 296 to the standard deviation values $\{\sigma_c\}$, where $$\sigma_c^2 = \frac{\sum_{s,e:c(e)=c} (x_{e,s} - \mu_s)^2}{\sum_{s,e:c(e)=c} 1} \quad (13)$$

and $\mu_s$ denotes the mean values calculated over the raw opinion scores 145 for the subjects 140. As a general matter, the initial value generator 270 may determine initial values for the subjective scores 244, the subject biases 292, the subject inconsistencies 294, and the content ambiguities 296 in any technically feasible fashion.

Finally, the belief propagation engine 276 implements a belief propagation algorithm that iteratively updates the model parameters 280 until satisfying a "stop threshold" that indicates that a sufficient level of convergence or optimization has been reached. At each iteration, the belief propagation engine 276 applies the update rules specified in equations (11) to update each of the model parameters 280. After the stop threshold is reached, the subjective modeling engine 150 sets the optimized subjective scores 155 equal to the subjective scores 255 that are included in the updated model parameters 280. When the stop threshold is reached, the model parameters 290 are also referred to herein as the "model parameters 290 of the solution." Accordingly, the optimized subjective scores 155 compensate for the subject biases 292, the subject inconsistencies 294, and the content ambiguities 296.

Consequently, for each portion of the reconstructed video content 135, the optimized subjective score 155 provides a more accurate assessment of the "true" visual quality of the portion of the reconstructed video content 135 than the corresponding raw opinion scores 150. Advantageously, generating perceptive quality metrics based on the optimized subjective scores 155 instead of the raw opinion scores 150 increases the accuracy of the perceptual quality metrics.

Note that the techniques described herein are illustrative rather than restrictive, and may be altered without departing from the broader spirit and scope of the invention. Further, many modifications and variations on the functionality provided by the subjective modeling engine 150, the update rule generator 272, the initial value generator 274, and the belief propagation engine 276 will be apparent to those of ordinary skill in the art without departing from the scope and spirit of the described embodiments. Alternate embodiments include any subjective modeling application that improves the accuracy of any type of subjective data including any type of subjective digital content assessments in any field based on jointly estimating "true" subjective scores and any number of subjective factors.

For instance, in alternate embodiments, the subjective modeling engine 150 may implement any type of optimization criterion instead of the maximum likelihood estimation (MLE) formulation 250. In various embodiments, the update rule generator 272 may derive update rules for the model parameters 280 based on any technically feasible update rule instead of the Newton-Raphson update rule. In alternate embodiments, the initial value generator 270 may generate initial values for the model parameters 280 in any technically feasible fashion. In other alternate embodiments, the subjective modeling engine 150 may optimize the model 230 based on any algorithm as known in the art instead of the belief propagation algorithm. As a general matter, in alternate embodiments, the model parameters 280 may include any number and type of subjective factors in any combination.

Further, the raw opinion scores 145 depicted in FIG. 2 correspond to a "full sampling" process in which each of the subjects 140 rates each portion of the reconstructed video content 135. However, in some alternate embodiments, the perceptual quality modeling system 100 may implement a "selective sampling" process in which one or more of the subjects 140 does not rate one or more of the portions of the reconstructed video content 135. Consequently, the raw opinion scores 145 will be incomplete. In such embodiments, as will be apparent to those of ordinary skill in the art, the techniques described herein may be modified to generate the optimized subjective scores 155 based on incomplete raw opinion scores 145. More specifically, as the subjective modeling engine 150, the update rule generator 272, the initial value generator 274, and the belief propagation engine 276 perform summations, the missing raw opinion scores 145 may be excluded.

Figure 3:
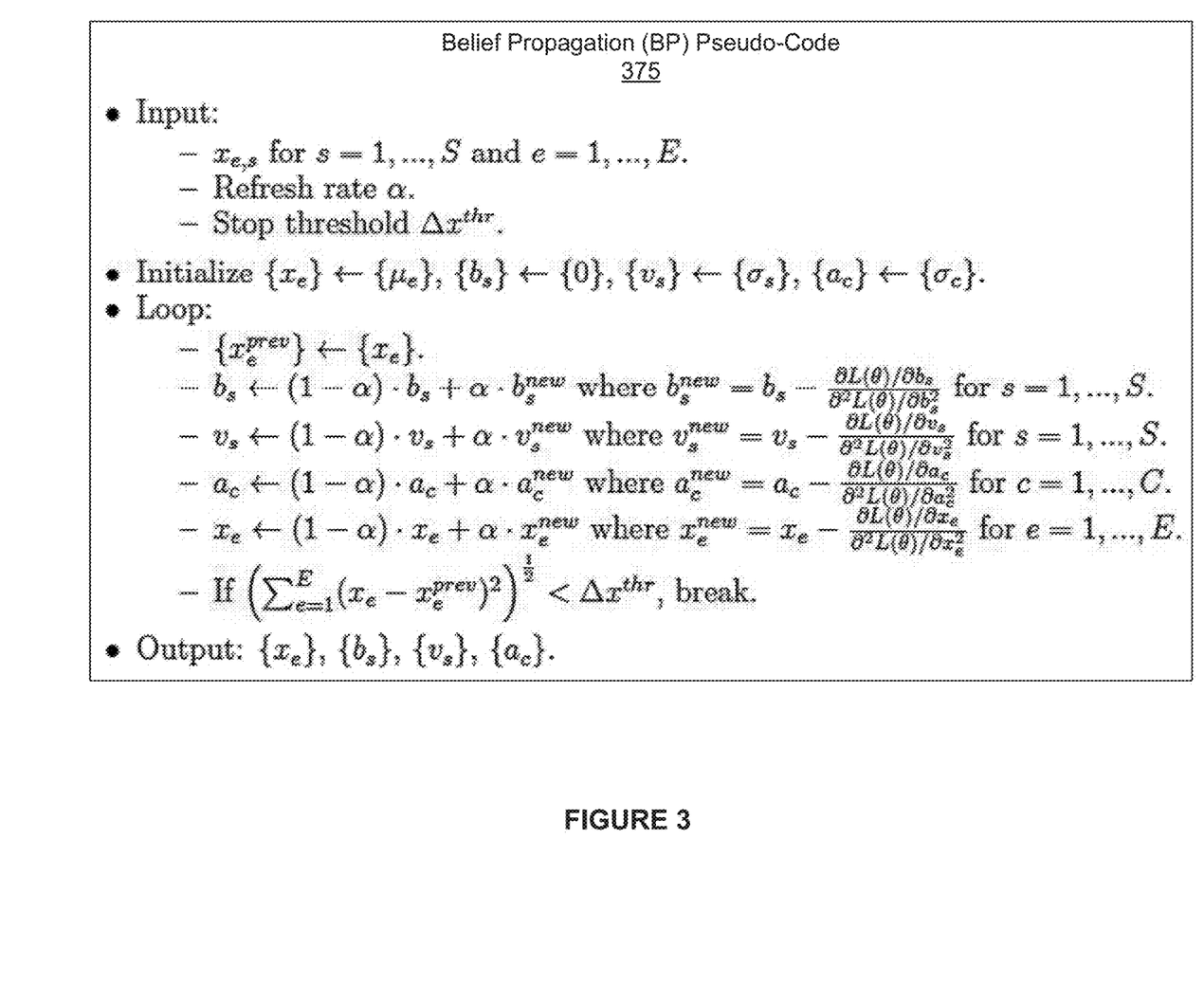
FIG. 3 illustrates an example of belief propagation pseudo-code that describes the operations performed by the belief propagation engine of FIG. 2, according various embodiments of the present invention.

FIG. 3 illustrates an example of belief propagation pseudo-code 275 that describes the operations performed by the belief propagation engine 276 of FIG. 2, according various embodiments of the present invention. As shown, the belief propagation pseudo-code 275 includes an "input" phase, an "initialize" phase, a "loop" phase, and an "output" phase. During the input phase, the belief propagation engine 276 receives the raw opinion scores 145 and sets a refresh rate and a stop threshold. The refresh rate correlates to the magnitude of the updates to the model parameters 280, and consequently the rate at which the belief propagation engine 276 approaches the solution. The stop threshold specifies a rate of convergence that correlates to an acceptable accuracy for the solution. The belief propagation engine 276 may be configured to implement any refresh rate and stop threshold. For example, in some embodiments, the belief propagation engine 276 sets the refresh rate to 0.1 and the stop threshold to 1e-9.

During the initialize phase, the belief propagation engine 276 sets the model parameters 280 equal to the corresponding initial values. As previously described, the initial value generator 274 computes the initial values. During the loop phase, the belief propagation engine 276 applies the update rules for the model parameters 280 to the model parameters 280. As previously described, the update rule generator 272 computes the update rules for the model parameters 280. As shown, the belief propagation engine 276 iteratively applies the update rules for the model parameters 280 until the belief propagation engine determines that the stop threshold has been reached. In the output phase, the belief propagation engine 276 identifies the updated model parameters 280 as the model parameters 280 of the solution.

After the belief propagation engine 276 finishes executing, the subjective modeling engine 150 sets the optimized subjective scores 155 equal to the subjective scores 255 included in model parameters 280 of the solution. The subjective modeling engine 150 then transmits the optimized subjective scores 155 to the perceptual quality trainer 160.

In alternate embodiments, the subjective modeling engine 150 may also transmit additional model parameters 280 that are included in the solution.

For instance, in some embodiments the subjective modeling engine 150 may transmit the subject biases 292, the subject inconsistencies 294, and the content ambiguities 296 included in the solution to the perceptual quality trainer 160. The perceptual quality trainer 160 may implement any number of techniques to refine the training of the perceptual quality model 165 based on the subject biases 292, the subject inconsistencies 294, and the content ambiguities 296. In yet other embodiments, the subjective modeling engine 150 may transmit the updated model parameters 280 to any number of applications in addition to or instead of the perceptual quality trainer 160.

Figure 4:
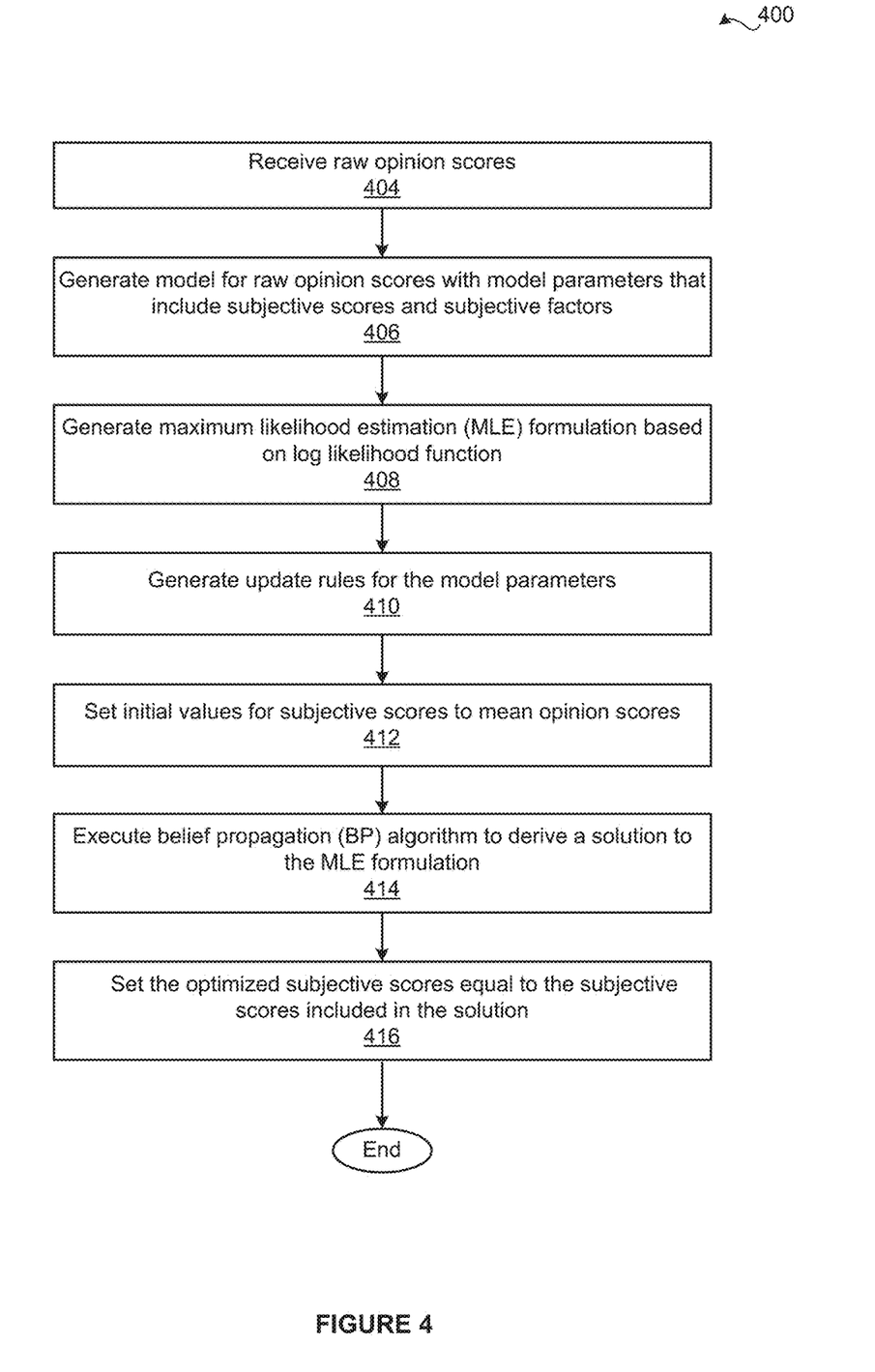
FIG. 4 is a flow diagram of method steps for mitigating inaccuracies in subjective digital content assessments, according to various embodiments of the present invention.

FIG. 4 is a flow diagram of method steps for mitigating inaccuracies in subjective digital content assessments, according to various embodiments of the present invention. Although the method steps are described with reference to the systems of FIGS. 1-3, persons skilled in the art will understand that any system configured to implement the method steps, in any order, falls within the scope of the present invention.

As shown, a method 400 begins at step 404, where the subjective modeling engine 150 receives the raw opinion scores 145. At step 406, the subjective modeling engine 150 generates the model 230 for the raw opinion scores 145. The model 230 includes the model parameters 280 for the subjective scores 255 as well as subjective factors. The subjective factors include the subject biases 292, the subject inconsistencies 294, and the content ambiguities 296. At step 408, the subjective modeling engine 150 generates the maximum likelihood estimation (MLE) formulation 250 of the model 230 based on the log likelihood function 240.

At step 410, the update rule generator 272 generate update rules for the model parameters 280 based on the log likelihood function 240 and the Newton-Raphson update rule. At step 412, the initial value generator 274 generates initial values for each of the model parameters 280. For each of the portions of reconstructed video content 135 included in the raw opinion scores 145, the initial value generator 274 sets the initial value associated with the corresponding subjective score 255 equal to the mean opinion score. For each of the subject biases 292, the initial value generator 274 sets the corresponding initial value equal to zero. The initial value generator 270 sets initial values for the subject inconsistencies 294 to the standard deviation values $\{\sigma_s\}$, and initial values for the content ambiguities 296 to the standard deviation values $\{\sigma_c\}$. As a general matter, the initial value generator 270 may determine initial values for the subjective scores 244, the subject biases 292, the subject inconsistencies 294, and the content ambiguities 296 in any technically feasible fashion.

At step 414, the belief propagation engine 276 executes a belief propagation algorithm to derive a solution to the maximum likelihood estimation (MLE) formulation 250 based on the update rules. As persons skilled in the art will recognize, the subjective scores 255 included in the model parameters 280 of the solution estimate the true subjective quality of the reconstructed video content 135. More specifically, for each portion of the reconstructed video content 135, the corresponding subjective score 255 included in the solution is an estimate of a raw opinion score that would be assigned to the portion of the reconstructed video content 135 by a hypothetical consistent and unbiased subject.

At step 416, the subjective modeling engine 150 sets the optimized subjective scores 155 equal to the subjective scores 255 included in the solution to the maximum likelihood estimation (MLE) formulation 250. Notably, the optimized subjective scores 155 comprehensively compensate for inaccuracies in the raw opinion scores 145 that are attributable to the subjective factors. Consequently, for each portion of the reconstructed video content 135, the optimized subjective score 155 provides a more accurate assessment of the "true" visual quality of the portion of reconstructed video content 135 than the associated raw opinion scores 150. Advantageously, generating perceptive quality metrics based on the optimized subjective scores 155 instead of the raw opinion scores 150 increases the accuracy of the perceptual quality metrics. The method 400 then terminates.

In sum, the disclosed techniques may be used to mitigate inaccuracies in raw opinion scores. In operation, a subjective modeling engine receives raw opinion scores that are generated by a variety of human subjects while viewing portions of reconstructed video content that are decoded from portions of encoded video content. The subjective modeling engine generates a model for the raw opinion scores that includes model parameters for per-portion subjective scores in addition to model parameters for subjective factors. The subjective factors include subject biases, subject consistencies, and content ambiguities. The subjective modeling engine then generates a maximum likelihood estimation (MLE) formulation of the model based on a log maximum likelihood function. Subsequently, the subjective modeling engine executes a belief propagation (BP) algorithm to derive a solution for the MLE formulation of the model. The solution includes optimized subjective scores.

Advantageously, because the subjective modeling engine jointly estimates the subjective scores and the subjective factors, the optimized subjective scores estimate the "true" scores that would be assigned by a hypothetical unbiased and consistent subject. By contrast, typically conventional approaches to mitigating inaccuracies in raw opinion scores only partially compensate for the subjective factors. Further, the subjective modeling engine can generate the optimized subjective scores based on incomplete raw opinion scores. Finally, the optimized solution includes estimates for subjective factors that provide additional information regarding the reliability of the raw opinion scores and the optimized subjective scores.

1. In some embodiments, a method comprises generating a model that includes a plurality of subjective content assessments and a plurality of parameters that comprise a plurality of subjective scores and a plurality of subjective factors; initializing the plurality of parameters; performing one or more optimization operations on the plurality of parameters to generate a plurality of optimized subjective scores and a plurality of optimized subjective factors, wherein the plurality of optimized subjective scores are configured to compensate for the plurality of optimized subjective factors; and storing or transmitting the plurality of optimized subjective scores to use as unbiased and consistent digital content assessments.

2. The method of clause 1, wherein the plurality of subjective factors includes a plurality of subject biases, a plurality of subject inconsistencies, and a plurality of content ambiguities.

3. The method of clauses 1 or 2, wherein a first subject bias included in the plurality of subject biases comprises a mean of a first Gaussian variable that is associated with a first human subject, a first subject inconsistency included in the plurality of subject inconsistencies comprises a square root of a variance of the first Gaussian variable, and a first content ambiguity included in the plurality of content ambiguities comprises a square root of a variance of a second Gaussian variable that is associated with a first source content.

4. The method of any of clauses 1-3, wherein the plurality of subjective content assessments includes at least one human-observed score of visual quality for a portion of reconstructed video content that is derived from a portion of encoded video content.

5. The method of any of clauses 1-4, wherein the plurality of optimized subjective scores includes an estimate of visual quality for the portion of reconstructed video content.

6. The method of any of clauses 1-5, wherein initializing the plurality of parameters comprises, for each subjective score included in the plurality of subjective scores, computing a mean opinion score (MOS) based on the plurality of subjective content assessments.

7. The method of any of clauses 1-6, wherein performing the one or more optimization operations comprises generating a maximum likelihood estimation (MLE) formulation of the model based on a log maximum likelihood function, and deriving a solution for the MLE formulation.

8. The method of any of clauses 1-7, wherein deriving the solution comprises executing a belief propagation (BP) algorithm on the MLE formulation.

9. The method of any of clauses 1-8, wherein the plurality of subjective content assessments includes at least one human-observed score of visual quality for image content, visual quality for computer graphics content, or sound quality of audio content.

10. In some embodiments, a computer-implemented computer-readable storage medium includes instructions that, when executed by a processor, cause the processor to perform the steps initializing a plurality of parameters included in a model for a plurality of subjective content assessments, wherein the plurality of parameters comprise a plurality of subjective scores and a plurality of subjective factors; jointly optimizing the plurality of subjective scores and the plurality of subjective factors to generate a plurality of optimized subjective scores and a plurality of optimized subjective factors, wherein the plurality of optimized subjective scores are configured to compensate for the plurality of optimized subjective factors; and storing or transmitting the plurality of optimized subjective scores to use as unbiased and consistent digital content assessments.

11. The computer-readable storage medium of clause 10, wherein the plurality of subjective factors includes a plurality of subject biases, a plurality of subject inconsistencies, and a plurality of content ambiguities.

12. The computer-readable storage medium of clauses 10 or 11, wherein a first subject bias included in the plurality of subject biases comprises a mean of a first Gaussian variable that is associated with a first human subject, a first subject inconsistency included in the plurality of subject inconsistencies comprises a square root of a variance of the first Gaussian variable, and a first content ambiguity included in the plurality of content ambiguities comprises a square root of a variance of a second Gaussian variable that is associated with a first source content.

13. The computer-readable storage medium of any of clauses 9-12, wherein the plurality of subjective content assessments includes at least one human-observed score of visual quality for a portion of reconstructed video content that is derived from a portion of encoded video content.

14. The computer-readable storage medium of any of clauses 9-13, wherein the plurality of optimized subjective scores includes an estimate of visual quality for the portion of reconstructed video content.

15. The computer-readable storage medium of any of clauses 9-14, wherein initializing the plurality of parameters comprises, for each subjective score included in the plurality of subjective scores, computing a mean opinion score (MOS) based on the plurality of subjective content assessments.

16. The computer-readable storage medium of any of clauses 9-15, wherein jointly optimizing comprises generating a maximum likelihood estimation (MLE) formulation of the model based on a log maximum likelihood function, and deriving a solution for the MLE formulation.

17. The computer-readable storage medium of any of clauses 9-16, wherein deriving the solution comprises executing a belief propagation (BP) algorithm on the MLE formulation.

18. The computer-readable storage medium of any of clauses 9-17, wherein the plurality of subjective content assessments includes a first assessment that is associated with a first subject and a first content, a second assessment that is associated with the first subject and a second content, and a third assessment that is associated with a second subject and the first content, and the plurality of subjective content assessments does not include any assessment that is associated with the second subject and the second content.

19. The computer-readable storage medium of any of clauses 9-18, wherein a first content and a second content are both derived from a source content, the plurality of subjective content assessments includes a first score that is associated with the first content and a second score that is associated with the second content, the plurality of subjective factors includes a first ambiguity that is associated with the source content, and the plurality of subjective scores includes a first subjective score that is associated with the first content and a second subjective score that is associated with the second content.

20. In some embodiments, a system comprises a memory storing instructions associated with a subjective modeling engine; and a processor that is coupled to the memory and, when executing the instructions, is configured to generate a model for a plurality of subjective content assessments that includes a plurality of subjective scores and a plurality of Gaussian variables that are associated with a plurality of subjective factors; perform one or more optimization operations on the model to generate a plurality of optimized subjective scores and a plurality of optimized Gaussian variables that are associated with a plurality of optimized subjective factors, wherein the plurality of optimized subjective scores are configured to compensate for the plurality of optimized subjective factors; and store or transmit the plurality of optimized subjective scores to use as unbiased and consistent digital content assessments.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow

What is claimed is:

1. A computer-implemented method, comprising:
generating a model that includes a plurality of subjective content assessments and a plurality of parameters, wherein the plurality of parameters comprises both a plurality of subjective scores and a plurality of subjective factors, and wherein the plurality of subjective factors identifies characteristics of one or more persons providing the subjective content assessments;
initializing the plurality of parameters;
performing one or more optimization operations on the plurality of parameters to generate a plurality of optimized subjective scores and a plurality of optimized subjective factors, wherein the plurality of optimized subjective scores are configured to reduce one or more inaccuracies in the plurality of subjective scores; and
storing or transmitting the plurality of optimized subjective scores to use as digital content assessments.

2. The computer-implemented method of claim 1, wherein the plurality of subjective factors includes at least one of first subjective factor that is based on one or more subjective preferences of a scoring entity, a second subjective factor that is based on an attentiveness level of the scoring entity, and a third subjective factor that is based on a type of content being scored by the scoring entity.

3. The computer-implemented method of claim 2, wherein the first subjective factor comprises a mean of a first Gaussian variable that is associated with a first human subject, the second subjective factor comprises a square root of a variance of the first Gaussian variable, and the third subjective factor comprises a square root of a variance of a second Gaussian variable that is associated with a first source content.

4. The computer-implemented method of claim 1, wherein the plurality of subjective content assessments includes at least one human-observed score of visual quality for a portion of reconstructed video content that is derived from a portion of encoded video content.

5. The computer-implemented method of claim 4, wherein the plurality of optimized subjective scores includes an estimate of visual quality for the portion of reconstructed video content.

6. The computer-implemented method of claim 1, wherein initializing the plurality of parameters comprises, for each subjective score included in the plurality of subjective scores, computing a mean opinion score (MOS) based on the plurality of subjective content assessments.

7. The computer-implemented method of claim 1, wherein performing the one or more optimization operations comprises generating a maximum likelihood estimation (MLE) formulation of the model based on a log maximum likelihood function, and deriving a solution for the MLE formulation.

8. The computer-implemented method of claim 7, wherein deriving the solution comprises executing a belief propagation (BP) algorithm on the MLE formulation.

9. The computer-implemented method of claim 1, wherein the plurality of subjective content assessments includes at least one human-observed score of visual quality for image content, visual quality for computer graphics content, or sound quality of audio content.

10. A non-transitory computer-readable storage medium including instructions that, when executed by a processor, cause the processor to perform the steps of:

initializing a plurality of parameters included in a model for a plurality of subjective content assessments, wherein the plurality of parameters, wherein the plurality of parameters comprises both a plurality of subjective scores and a plurality of subjective factors, and wherein the plurality of subjective factors identifies characteristics of one or more persons providing the subjective content assessments;
jointly optimizing the plurality of subjective scores and the plurality of subjective factors to generate a plurality of optimized subjective scores and a plurality of optimized subjective factors, wherein the plurality of optimized subjective scores are configured to reduce one or more inaccuracies in the plurality of subjective scores; and
storing or transmitting the plurality of optimized subjective scores to use as digital content assessments.

11. The computer-readable storage medium of claim 10, wherein the plurality of subjective factors includes at least one of first subjective factor that is based on one or more subjective preferences of a scoring entity, a second subjective factor that is based on an attentiveness level of the scoring entity, and a third subjective factor that is based on a type of content being scored by the scoring entity.

12. The computer-readable storage medium of claim 11, wherein the first subjective factor comprises a mean of a first Gaussian variable that is associated with a first human subject, the second subjective factor comprises a square root of a variance of the first Gaussian variable, and the third subjective factor comprises a square root of a variance of a second Gaussian variable that is associated with a first source content.

13. The computer-readable storage medium of claim 10, wherein the plurality of subjective content assessments includes at least one human-observed score of visual quality for a portion of reconstructed video content that is derived from a portion of encoded video content.

14. The computer-readable storage medium of claim 13, wherein the plurality of optimized subjective scores includes an estimate of visual quality for the portion of reconstructed video content.

15. The computer-readable storage medium of claim 10, wherein initializing the plurality of parameters comprises, for each subjective score included in the plurality of subjective scores, computing a mean opinion score (MOS) based on the plurality of subjective content assessments.

16. The computer-readable storage medium of claim 10, wherein jointly optimizing comprises generating a maximum likelihood estimation (MLE) formulation of the model based on a log maximum likelihood function, and deriving a solution for the MLE formulation.

17. The computer-readable storage medium of claim 16, wherein deriving the solution comprises executing a belief propagation (BP) algorithm on the MLE formulation.

18. The computer-readable storage medium of claim 10, wherein the plurality of subjective content assessments includes a first assessment that is associated with a first subject and a first content, a second assessment that is associated with the first subject and a second content, and a third assessment that is associated with a second subject and the first content, and the plurality of subjective content assessments does not include any assessment that is associated with the second subject and the second content.

19. The computer-readable storage medium of claim 10, wherein a first content and a second content are both derived from a source content, the plurality of subjective content assessments includes a first score that is associated with the first content and a second score that is associated with the second content, the plurality of subjective factors includes a first ambiguity that is associated with the source content, and the plurality of subjective scores includes a first subjective score that is associated with the first content and a second subjective score that is associated with the second content.

20. A system comprising:
   a memory storing instructions associated with a subjective modeling engine; and
   a processor that is coupled to the memory and, when executing the instructions, is configured to:
      generate a model for a plurality of subjective content assessments, wherein the model includes both a plurality of subjective scores and a plurality of Gaussian variables that are associated with a plurality of subjective factors, and wherein the plurality of subjective factors identifies characteristics of one or more persons providing the subjective content assessments;
      perform one or more optimization operations on the model to generate a plurality of optimized subjective scores and a plurality of optimized Gaussian variables that are associated with a plurality of optimized subjective factors, wherein the plurality of optimized subjective scores are configured to reduce one or more inaccuracies in the plurality of subjective scores; and
   store or transmit the plurality of optimized subjective scores to use as digital content assessments.

* * * * *